June 30, 1964     S. R. TOMES     3,139,544

MAGNETOSTRICTIVE SENSING DEVICES

Filed July 16, 1962

INVENTOR
SIDNEY R. TOMES,

BY Burns, Doane, Benedict, Swecker & Mathis

ATTORNEY

United States Patent Office

3,139,544
Patented June 30, 1964

3,139,544
MAGNETOSTRICTIVE SENSING DEVICES
Sidney R. Tomes, Whitestone, N.Y., assignor, by mesne assignments, to Powertron Corporation, a corporation of Delaware
Filed July 16, 1962, Ser. No. 210,133
8 Claims. (Cl. 310—26)

This invention relates to sensing devices of the type used to detect liquid surfaces.

Probes or sensors of the resonator type are employed to detect the presence or absence of a liquid or gas within a tank or other container. Such units are capable of producing and detecting vibrations of a resonator member. For example, vibratory energy is applied by a driving coil to a resonator member and tuned to the natural period of vibration of the resonator. Mechanical vibration of the resonator is sensed by a driven coil. When the resonator contacts a liquid surface, the vibration characteristics of the resonator are changed, and this change is sensed by suitable apparatus connected with the driven coil.

Conventional probes are prone to erratic behavior or complete failure if the liquid to be detected has a high entrapped gas content. Attempts to overcome the failure of conventional probes to react accurately have failed because, if the sensitivity of the probe is increased to the point where it will reliably indicate a wet or covered condition in aerated solutions, it will fail to indicate a dry or uncovered condition after the probe has been withdrawn from the liquid. This is because droplets of the liquid retained by surface tension on the probe behave acoustically and have the same effect generally as if the entire probe surface were covered by an aerated liquid.

Likewise, conventional probes used with cryogenic liquids do not always respond accurately when the probe contacts the liquid. There is considerable delay in time response after a rising liquid level contacts the probe or after the probe is lowered to the liquid surface. This is because the probe is at a higher temperature normally than the cryogenic liquid, and when the probe contacts the liquid, boiling occurs until the probe temperature falls below the critical temperature of the liquid.

One purpose of this invention is to provide a probe which is highly sensitive and reliably accurate for use in sensing the presence of liquids having a high entrapped gas content.

Another object of this invention is to provide a probe which is highly sensitive and suitably accurate for use with cryogenic liquids.

This invention contemplates the use of a probe having a tubular housing within which is mounted a tubular, one-half wave resonator member. The resonator is fastened to the housing by means of a mounting section connected to the resonator at or about a quarter wave point in order to reduce undesirable acoustic coupling into the housing. The upper end of the housing is enclosed and contains a driving coil and a polarizing magnet, both of well-known form for setting up vibrations. Also within the enclosed portion of the housing is a driven coil for sensing mechanical vibrations and converting the vibrations into electric singals. The lower end of the housing serves as a shield within which the exposed or lower end of the resonator extends. The shield end of the housing is provided with holes through which liquid may flow to ensure that the exposed end of the resonator has free contact with the liquid.

In one embodiment of this invention, the extreme exposed end of the resonator terminates into a closed cone shape. In another embodiment of this invention, the extreme exposed end of the resonator terminates in an outwardly flared portion.

These embodiments of the invention are illustrated in the accompanying drawings in which.

Figure 1:
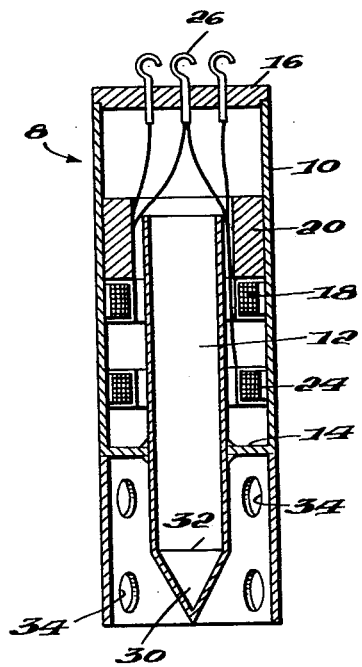
FIG. 1 is a cross-sectional elevation view of a probe structure of this invention showing a resonator member having an exposed end in the shape of a cone.

The probe illustrated in FIG. 1 has a housing 10 of tubular shape and may be of stainless steel or other suitable material. Coaxially aligned within the housing 10 is a resonator member 12, also of tubular shape but of smaller diameter than the housing 10. The tubular resonator 12 has an acoustic length of one or more one-half wave lengths and is mounted to the housing 10 by a mounting section 14 of annular shape which is connected with the resonator 12 at a quarter wave point by brazing or other suitable connecting means. If the resonator 12 is one-half wave length, there will be maximum vibration at the ends thereof and two nodal points therebetween at which minimum vibrations will occur. The connection between the resonator 12 and the housing 10 is made at one of the nodal points in order to reduce undesirable transfer of vibrations to the housing.

The mounting portion 14, in addition to connecting the resonator 12 to the housing 10, serves to seal off the lower end of the housing with respect to the upper end. An end cover or seal 16 cooperates with the mounting portion 14 to provide an enclosed chamber within the housing 10 in which there is located a driving coil 18 and an attendant polarizing magnet 20. Alternating current is supplied to the driving coil 18 and a direct current is supplied to the polarizing magnet 20 to cause the resonator 12, which may be of magnetostrictive nickel to vibrate.

Also within the enclosed chamber at the upper end of the housing 10, is a driven coil 24 surrounding the resonator 12. Vibrations of the resonator produce electrical signals within the driven coil 24 which signals are sensed by suitable well-known apparatus.

The portion of the resonator 12 which is within the enclosed chamber must be made from a material having magnetostrictive characteristics, however the exposed end of the resonator may be made from nickel or any material having a suitably high mechanical Q. The material may be chosen for its compatability with the liquids or vapors to which it is to be exposed.

Insulated hermetic terminals 26 extend from the upper end cover 16 and have leads extending therefrom to the driving coil 18, the polarizing magnet 20 and the driven coil 24. The driving coil 18 is connected with a frequency generator and the polarizing magnet is connected with a suitable source of direct current. The driven coil 24 is connected with an oscilloscope or other suitable means for indicating a change in the pulses produced by the driven coil.

Voltage pulses of suitable frequency are supplied to the driving coil 18 to cause the resonator 12 to vibrate at its resonate frequency. When the resonator 12 engages a liquid, the resonate characteristics of the resonator are changed and this in turn changes the signal pulses produced by the driven coil 24. Such changes in electrical pulses are sensed and indicate that the probe 8 is in contact with the liquid. The probe may be connected with various signals, alarms, control valves, etc., as desired.

Various problems have arisen in the past when probe devices have been used with a liquid which has a high content of entrapped gas. Because a highly aerated liquid has a relatively low acoustic loading effect, the probes must have a high sensitivity. Increasing the sensitivity of the probe, however, does not always produce satisfactory results because the liquid may tend to cling to the lower or exposed end of ordinary resonator members. Conventional types of sensitive probes often times fail to indicate a dry or uncovered condition after the probe has been withdrawn from the liquid or after the liquid level has receded. The tiny droplets of liquid which may be retained by surface tension on the exposed end of conventional resonators behave acoustically and affect the resonator in the same manner as an aerated liquid or a liquid having a high entrapped gas content. Consequently, conventional probes are not usually reliable when such liquids are to be detected by the probe.

The resonator 12 of the probe 8 has its lower or exposed end terminating in a thin-walled, steep-angled cone 30. The cone portion 30 does not form a part of a resonator 12, but rather the cone portion 30 is driven at its periphery 32 by the lower end of the resonator 12. The cone 30 is in effect a conical diaphragm which does not mass load or in any way restrict the vibration of the resonator 12 when the cone is dry. Because of the low mass and low compliance of the cone 30, it will behave as a piston and will be extremely sensitive to the application of any viscous or liquid loading on its surface. Accordingly, when the cone 30 contacts a liquid, even a highly aerated liquid, it will apply considerable acoustic loading to the resonator 12.

Furthermore, the cone 30 reduces the undesirable effect resulting from clinging droplets. When the probe is removed from the liquid or when the liquid level recedes, any droplets remaining will tend to drain down the angled wall of the cone to the extreme pointed tip, and even if a small droplet should cling to the tip of the cone, the acoustic loading of that single droplet will be negligible and not seriously affect the sensitivity of the probe.

The lower end of the housing 10 surrounds the exposed end of the resonator 12 to protect and shield the resonator from damage. The shield end only of the housing is provided with holes 34 through which liquid may flow to ensure that the liquid may freely contact the exposed end of the resonator. The shield end of the housing extends far enough to protect the point on the cone portion 30, as shown in FIG. 1.

Figure 3:
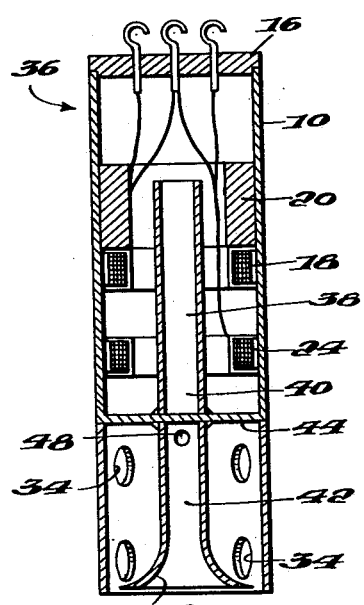
FIG. 3 is a cross-sectional elevation view of a probe having a resonator member with an exposed end which is flared outwardly.
Figure 2:
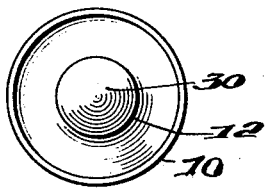
FIG. 2 is a bottom plan view of the probe shown in FIG. 1.

In FIG. 3 there is illustrated a probe 36 which is highly efficient for use with cryogenic liquids and which is generally of the same construction as the probe 8, including a housing 10, a driving coil 18, a polarizing magnet 20, and a driven coil 24. The driving coil 18 and the polarizing magnet 20 function in the well-known manner as does the driven coil 24, as explained with respect to the probe 8.

A tubular-shaped resonator member 38 is aligned coaxially within the housing 10 and is caused to vibrate by the driving coil 18. The resonator 38 is one-half wave length long, or a multiple thereof, and includes an upper portion 40 enclosed within the upper section of the housing 10 and a lower or exposed section 42. Adjacent ends of section 40 and section 42 are brazed or otherwise fastened to a disc 44 forming a seal for enclosing the upper portion of the housing 10. Sections 40 and 42 are aligned longitudinally to in effect form a continuous resonator member. The point of connection of the sections 40 and 42 to the disc 44 is at a quarter point of the entire resonator 38 to minimize the vibrational forces which may be transferred to the housing 10.

Figure 4:
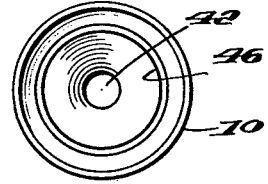
FIG. 4 is a bottom plan view of the probe illustrated in FIG. 3.

The section 42 of the resonator 38 is made of a material which is highly heat conductive. The material may be copper or a similar highly heat conductive metal and is relatively thin so as to enhance the transfer of heat. As illustrated in FIGS. 3 and 4, the extreme bottom portion of section 42 is flared outwardly at 46. This flared out portion 46 increases the surface area of the extreme lower end of section 42 so as to ensure a greater area of contact of the resonator 38 with the cryogenic fluid with which the probe 36 is adapted to be used.

The upper portion of the section 42 adjacent the disc 44 is provided with a hole 48 to allow any vapor which may collect inside the section 42 to escape. This allows the cryogenic fluid to fill the inside of the section 42 without being blocked by vapor which may collect within the section 42. The large surface area provided by section 42 of the resonator 38, and the thin-walled, highly heat conductive material ensure that the exposed end of the resonator 38 will rapidly assume the temperature of the cryogenic fluid.

This construction of the resonator 38 eliminates a time delay while the resonator assumes the temperature of the cryogenic liquid. Such a time delay is normally present in conventional types of probes because a boiling effect is produced which renders conventional probes sometimes unacceptable in accuracy or response. This difficulty has been eliminated, however, by providing the exposed end of the resonator 38 with a highly conductive heat material, which may be copper for example, in the form of a flared-out, thin-walled portion capable of rapidly assuming the temperature of the cryogenic liquid when the probe comes in contact with the liquid. Accordingly, probe 36 is highly sensitive to cryogenic liquids and the response to contact of the probe 36 with such liquids is highly satisfactory.

While the invention has been illustrated and described in certain embodiments, it is recognized that other variations and changes may be made therein without departing from the invention as set forth in the claims.

I claim:

1. A liquid sensing device comprising a tubular housing, a tubular resonator member aligned coaxially within said housing, a mounting portion connecting a minimum point of vibration of said resonator to said housing and sealing one end of said housing from the other, and means within one end of said housing for vibrating said resonator member, the other end of said housing being provided with holes for the passage of a liquid therethrough and serving as a shield for one end of the resonator member.

2. A liquid sensing device comprising a tubular housing, a tubular resonator member aligned coaxially within said housing, a mounting portion connecting a minimum point of vibration of said resonator to said housing and sealing one end of said housing from the other, means sealing one end of the housing to form a sealed chamber therein, means in said chamber for vibrating said resonator member and for sensing vibrations of said resonator member, the other end of said housing being provided with holes for the passage of a liquid therethrough and serving as a shield for one end of the resonator member.

3. A liquid sensing device comprising a tubular housing, a resonator member mounted to the inside of said housing at a point of minimum vibration, a sealed chamber within one end of said housing, means for vibrating said resonator member, said means and one end of said resonator member being located within said sealed chamber, the other end of said resonator adapted to contact a liquid, and a cone portion on said other end of said resonator the periphery of which engages said resonator member.

4. A liquid sensing device comprising a tubular housing, a resonator member mounted to the inside of said housing at a point of minimum vibration, a sealed chamber within one end of said housing, means for vibrating said resonator member, said means and one end of said resonator member being located within said sealed chamber, the other end of said resonator adapted to contact a liquid, and a thin-walled steep-angled cone portion on said other end of said resonator the periphery of which engages said resonator member.

5. A liquid sensing device comprising a tubular housing, a resonator member mounted to the inside of said housing at a point of minimum vibration, a sealed chamber within one end of said housing, means for vibrating said resonator member, said means and one end of said resonator member being located within said sealed chamber, the other end of said resonator adapted to contact a liquid, and a thin-walled steep-angled cone portion on said other end of said resonator the periphery of which engages said resonator member, and located within said housing.

6. A liquid sensing device comprising a tubular housing, a resonator member mounted to the inside of said housing at a point of minimum vibration, a sealed chamber within one end of said housing, means for vibrating said resonator member, said means and one end of said resonator member being located within said sealed chamber, the other end of said resonator adapted to contact a liquid, and a flared out portion on said other end of said resonator.

7. A liquid sensing device comprising a tubular housing, a resonator member mounted to the inside of said housing at a point of minimum vibration, a sealed chamber within one end of said housing, means for vibrating said resonator member, said means and one end of said resonator member being located within said sealed chamber, the other end of said resonator adapted to contact a liquid, and a flared-out, thin-walled portion of highly heat conductive material on said other end of said resonator.

8. A liquid sensing device comprising a tubular housing, a resonator member mounted to the inside of said housing at a point of minimum vibration, a sealed chamber within one end of said housing, means for vibrating said resonator member, said means and one end of said resonator member being located within said sealed chamber, the other end of said resonator adapted to contact a liquid, and a flared-out, thin-walled portion of highly heat conductive material on said other end of said resonator, and located within said housing.

References Cited in the file of this patent

UNITED STATES PATENTS

| | | |
|---|---|---|
| 1,882,394 | Pierce | Oct. 11, 1932 |
| 1,966,446 | Hayes | July 17, 1934 |
| 2,445,318 | Eldredge et al. | July 20, 1948 |
| 2,621,905 | Daniell | Dec. 16, 1952 |
| 2,721,100 | Bodine | Oct. 18, 1955 |
| 2,990,482 | Kenny | June 27, 1961 |